T. M. BRINTNALL.
SIDEWALK TRAP.
APPLICATION FILED DEC. 4, 1911.

1,176,337.                                                    Patented Mar. 21, 1916.

Witnesses:
Sully Russo
J. D. Thornburgh

Inventor
Thomas M. Brintnall
by Syou & Hackley
atty.

THE COLUMBIA PLANOGRAPH CO., WASHINGTON, D. C.

UNITED STATES PATENT OFFICE.

THOMAS M. BRINTNALL, OF OAKLAND, CALIFORNIA, ASSIGNOR OF ONE-HALF TO W. D. HAMMOND, OF LOS ANGELES, CALIFORNIA.

SIDEWALK-TRAP.

1,176,337.  Specification of Letters Patent.  Patented Mar. 21, 1916.

Application filed December 4, 1911. Serial No. 663,967.

*To all whom it may concern:*

Be it known that I, THOMAS M. BRINTNALL, a citizen of the United States, residing at Oakland, in the county of Alameda and State of California, have invented new and useful Improvements in Sidewalk-Traps, of which the following is a specification.

This invention relates to sidewalk traps and has for its object to construct the trap with a surface of concrete, cement, or tile, or other product which may be similar to the material of which the sidewalk is constructed, and to reinforce the material forming the sidewalk trap in such manner that it will have the requisite strength and conform to and harmonize with the sidewalk and present its upper surface flush therewith.

Figure 1:
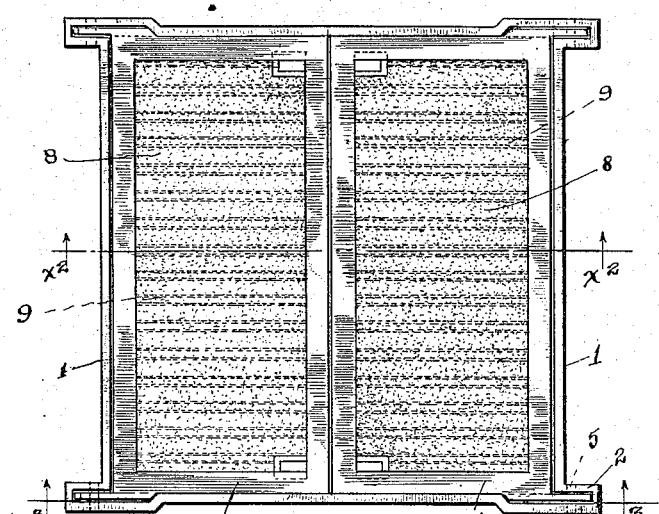
Figure 6:
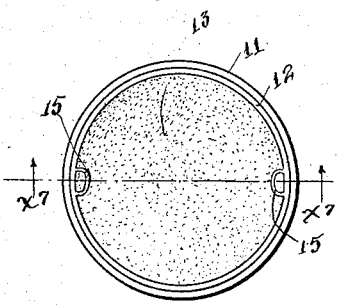
Figure 7:
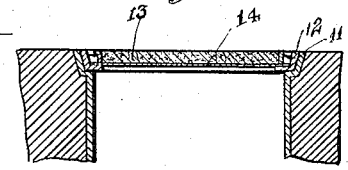
Figure 2:
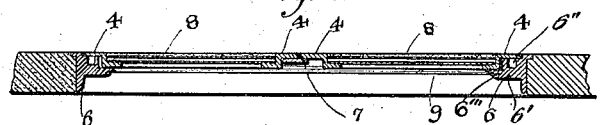
Figure 3:
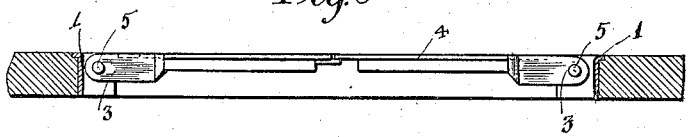
Figure 4:
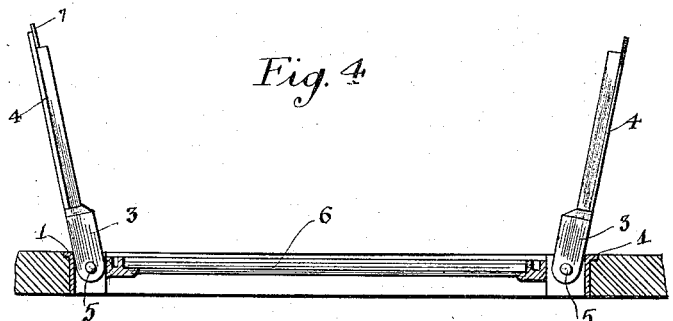
Figure 5:
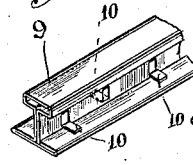

Referring to the drawings: Figure 1 is a plan view of the invention. Fig. 2 is a section on line $x^2$—$x^2$ in Fig. 1. Fig. 3 is a section on line $x^3$—$x^3$ in Fig. 1. Fig. 4 is a view similar to Fig. 3, showing the doors lifted. Fig. 5 is an enlarged perspective view of the reinforcing member. Fig. 6 is a plan view of another form. Fig. 7 is a cross section on line $x^7$—$x^7$ in Fig. 6.

1 designates a frame which extends around the trap and is formed in each corner with projecting loops 2, which receive ears 3 which project from door frames 4. The frame of each door is formed of a Z-bar, as shown in cross section in Fig. 2, and the ears 3 are pivoted in the loops 2 by pins 5. The frame 1 is formed with an inwardly offset portion 6' which is equal to approximately half the depth of the frame and extends from a point below the upper edge of the frame to a point substantially midway of the upper and lower edge thereof. This offset portion is formed in its upper face with a moisture receiving channel 6''. Projecting inwardly from and formed integral with the offset portion 6', is a door supporting flange 6'''. The upper horizontal flanges of the Z bars of the door frames 4 rest upon the upper face of the frame and offset portion and cover or seal the moisture receiving channel 6'', said flanges lying flush with the upper edge of the frame. The lower horizontal flanges of the Z bars rest upon the door supporting flanges 6'''. Strain placed upon the doors is evenly distributed upon the frame 1 and parts thereof in view of the supporting flange 6''' and the coöperation of the X bars therewith.

In order to insure that the inner edges of the doors shall be flush with each other, a ledge 7 is secured under the left hand door, as shown in Fig. 2, and projects under the edge of the right hand door, so that the latter will rest thereon and be flush with the left hand door.

The door frames 4 are filled with panels 8 of concrete or other material, and the concrete is reinforced by bars 9 which rest upon the frames 4 and are embedded in the concrete. Fig. 5 shows the construction of a bar 9 which consists of an I-bar of sheet metal, the web of which is punched to produce alternately projecting lugs 10 on each side of the bar, and more securely fasten the reinforcing bar in position.

In the form shown in Fig. 6, the frame 11 is circular and conical as shown, and the door 12 is formed with a conical circular frame which has a disk shaped panel 13 of concrete which may be reinforced by rods 14. A hand-hold 15 is provided for lifting it.

What I claim is:

1. A sidewalk trap comprising a stationary frame, an inwardly offset portion formed on the frame and having its upper edge located below the upper edge of the frame, said offset portion having a moisture receiving channel therein, an inwardly extending supporting flange carried by the offset portion and located below the upper edge thereof, and door members hinged to the frame, closing the moisture receiving channel and resting upon the supporting flange.

2. A sidewalk trap comprising a stationary frame, an inwardly offset portion formed on the frame and having its upper edge located below the upper edge of the frame, said offset portion having a moisture receiving channel therein, an inwardly extending supporting flange carried by the offset portion and located below the upper edge thereof, and door frames hinged to the stationary frame and comprising bars Z shape in cross section, the upper flange of the door frame bars engaging the stationary frame and offset portion and closing the moisture receiving channel and the lower flange of the bars resting upon the supporting flange.

In testimony whereof I have hereunto set my hand at Los Angeles, California, this 28 day of November, 1911.

THOMAS M. BRINTNALL.

In presence of—
G. F. HACKLEY,
W. D. HAMMOND.

Copies of this patent may be obtained for five cents each, by addressing the "Commissioner of Patents, Washington, D. C."